US007715559B2

(12) United States Patent
Rainbolt et al.

(10) Patent No.: US 7,715,559 B2
(45) Date of Patent: May 11, 2010

(54) CRYPTO-SYNCHRONIZATION FOR SECURE COMMUNICATION

(75) Inventors: Bradley J. Rainbolt, Sunrise, FL (US); Marc A. Boillot, Plantation, FL (US)

(73) Assignee: Motorola, Inc., Schaumburg, IL (US)

( * ) Notice: Subject to any disclaimer, the term of this patent is extended or adjusted under 35 U.S.C. 154(b) by 804 days.

(21) Appl. No.: 10/926,830

(22) Filed: Aug. 26, 2004

(65) Prior Publication Data

US 2006/0045136 A1 Mar. 2, 2006

(51) Int. Cl.
*H04L 1/00* (2006.01)
(52) U.S. Cl. .................. 380/225; 380/33; 380/258; 380/259; 380/260; 380/270; 380/274; 380/277; 370/509; 370/510; 709/227; 709/230; 709/236; 713/168; 713/171
(58) Field of Classification Search .......... 380/225
See application file for complete search history.

(56) References Cited

U.S. PATENT DOCUMENTS

| | | | |
|---|---|---|---|
| 5,357,571 A | 10/1994 | Banwart | |
| 5,768,380 A | 6/1998 | Rosauer et al. | |
| 6,445,686 B1 | 9/2002 | Hoffbeck et al. | |
| 6,477,150 B1 | 11/2002 | Maggenti et al. | |
| 6,477,387 B1 | 11/2002 | Jackson et al. | |
| 6,611,607 B1 * | 8/2003 | Davis et al. | 382/100 |
| 7,003,114 B1 | 2/2006 | Mauro | |
| 7,007,170 B2 * | 2/2006 | Morten | 713/193 |
| 7,069,031 B2 | 6/2006 | Maggenti et al. | |
| 2002/0031126 A1 | 3/2002 | Crichton et al. | |
| 2002/0172364 A1 | 11/2002 | Mauro | |
| 2003/0012149 A1 | 1/2003 | Maggenti et al. | |
| 2005/0025315 A1 | 2/2005 | Kreitzer | |
| 2006/0045136 A1 | 3/2006 | Rainbolt et al. | |

OTHER PUBLICATIONS

Zhong, Y.,' Advances in Coding and Compression', IEEE Communications Magazine, Jul. 1993, pp. 70-72, http://ieeexplore.ieee.org/stamp/stamp.jsp?arnumber=00222482.*
Chung-Ping Wu,et al, 'Design of Integrated Multimedia Compression and Encryption Systems', IEEE Transactions on Multimedia, vol. 7, No. 5, Oct. 2005, pp. 828-839, http://ieeexplore.ieee.org/stamp/stamp.jsp?tp=&arnumber=1510630.*
Patent Cooperation Treaty, "International Search Report and Written Opinion", ISA/US, by Officer Nasser Moazzami in PCT Application No. PCT/US2006/16928; Document of 12 pages dated Mar. 19, 2008.
Patent Cooperation Treaty, "International Search Report and Written Opinion", ISA/US, by Officer Melur Ramakrishnaiah in PCT Application No. PCT/US2006/16928; Document of 7 pages dated Oct. 16, 2008.
U.S. Patent and Trademark Office, "Non-Final Office Action" in U.S. Appl. No. 11/132,643, Document of 9 pages dated Jul. 3, 2008.

* cited by examiner

*Primary Examiner*—Edan Orgad
*Assistant Examiner*—Ronald Baum

(57) ABSTRACT

An apparatus (213) and corresponding methods (FIG. 7) to facilitate maintaining crypto synchronization while processing communication signals in a communication unit includes a vocoder (215) configured to convert input audio band signals to vocoder output frames; a crypto processor (217) configured to encrypt the vocoder output frames to provide encrypted output frames; and a synchronizer (219) configured to substitute in a predetermined manner synchronization information corresponding to an encryption state of the crypto processor for a portion of the encrypted data in a portion of the encrypted output frames to provide resultant output synchronization frames suitable for synchronizing a decryption process at a target communication unit.

19 Claims, 4 Drawing Sheets

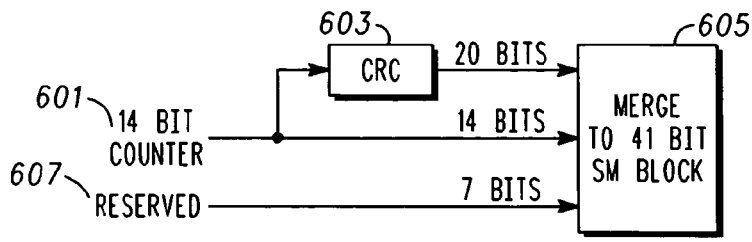
FIG. 6
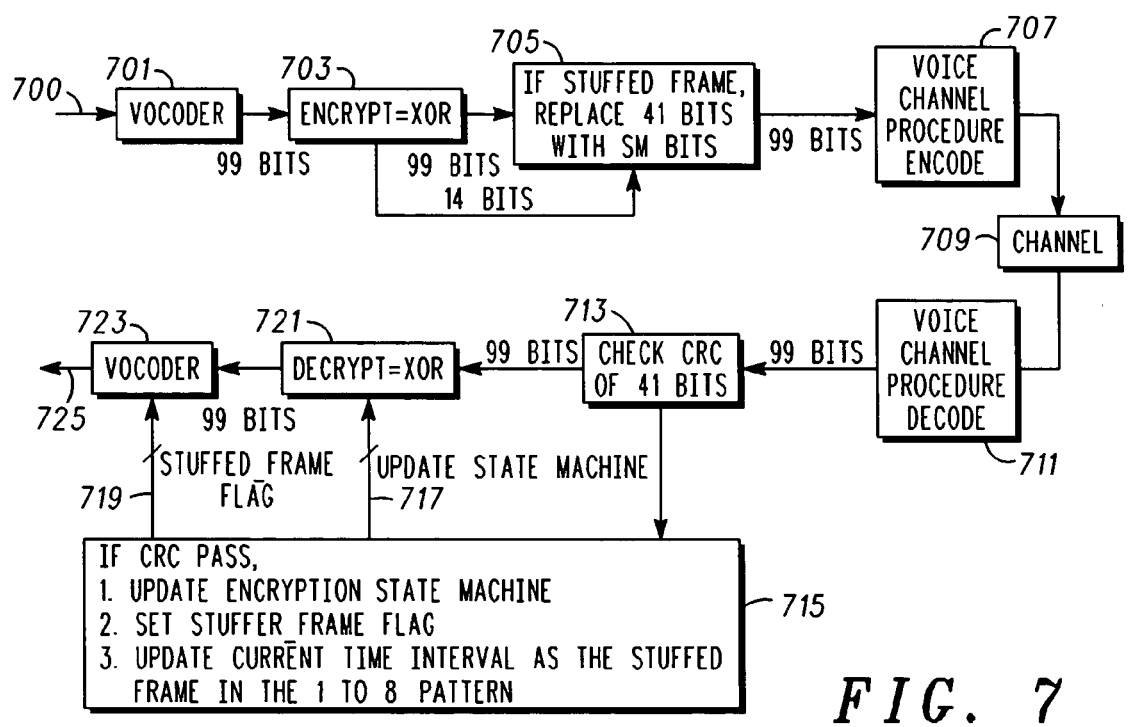
FIG. 7
FIG. 8
| FRAME PATTERN | PERCENT OF VOICE FRAMES | AUDIO QUALITY |
|---|---|---|
| 3 OF 8 | 0.375 | INTELLIGIBLE, BUT NOTICEABLE DEGRADITION, SOUNDS SYNTHETIC |
| 1 OF 4 | 0.250 | INTELLIGIBLE, NOTICEABLE BUT TOLERABLE SYNTHETIC SOUND |
| 1 OF 6 | 0.167 | INTELLIGIBLE, DEGRADATION BARELY NOTICEABLE |
| 1 OF 8 | 0.125 | INTELLIGIBLE, VIRTUALLY NO DEGRATION |

CRYPTO-SYNCHRONIZATION FOR SECURE COMMUNICATION

FIELD OF THE INVENTION

This invention relates in general to communication systems, and more specifically to schemes for establishing or maintaining crypto synchronization for secure communications.

BACKGROUND OF THE INVENTION

Communication systems and secure communications in such systems are known. Typically security is provided using some form of crypto key to encrypt information that is sent from the originator or sending party or unit. The target or receiving party or unit then decrypts this information using the same or a corresponding crypto key to yield the information in its original form. To enhance security the crypto key may change from time to time, for example with every frame. Typically this change is a deterministic change that depends on the state of the encryption or decryption processes. The originating unit and target unit have to make sure their crypto keys are synchronized or else the target unit will not be able to successfully decrypt the information. Given the deterministic nature for the change this is straight forward, except, for example, when a frame or packet is added, such as for example an overhead packet added by the system, in which case crypto synchronization may be lost. Known approaches sometimes devote entire frames or packets or other overhead means just to synchronization information, but this tends to waste channel capacity or result in long delays to re-establish synchronization and thus poor audio quality.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 6 depicts a block diagram demonstrating certain functionality of a crypto synchronizer;

FIG. 7 provides a simplified and exemplary system level functional diagram for synchronization management scheme; and FIG. 8 through FIG. 10 depict various performance information for a crypto-synchronization scheme.

DETAILED DESCRIPTION OF PREFERRED EMBODIMENT

Figure 1:
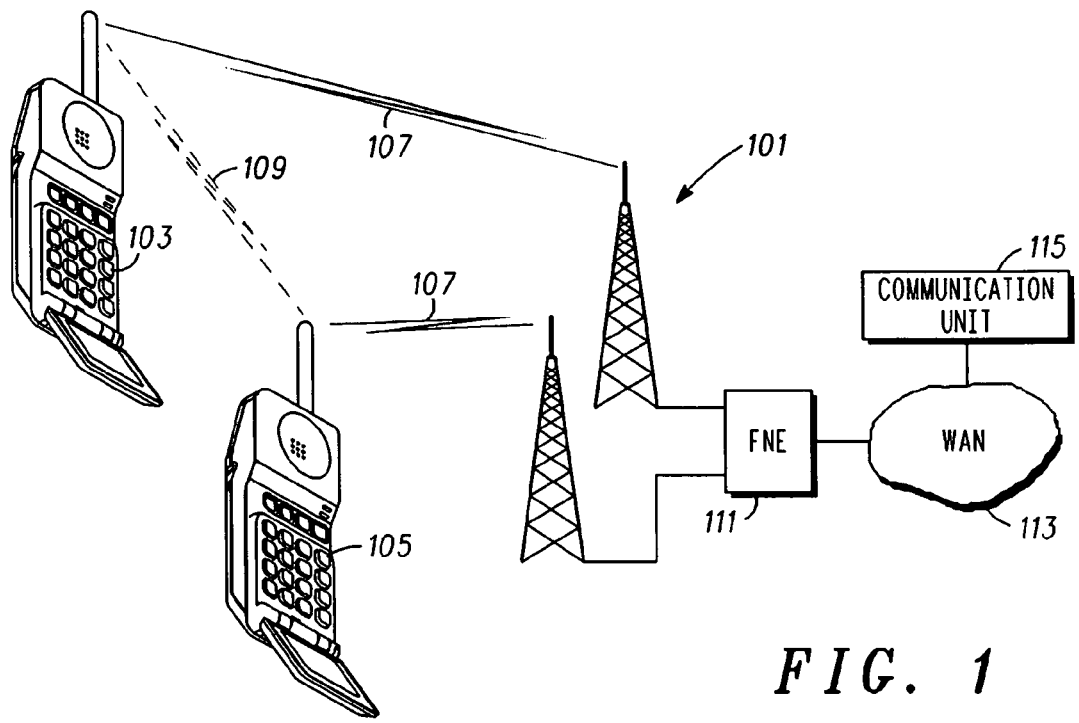
FIG. 1 depicts, in a simplified and representative form, a system level diagram of a communications system and two communication units.

In overview, the present disclosure concerns communications systems that provide service to communications units or more specifically user thereof operating therein. More particularly various inventive concepts and principles embodied in methods and apparatus for maintaining crypto synchronization between an originator or originating communication unit and a target or target communication unit to facilitate secure communications are discussed and described.

The term communication device or communication unit may be used interchangeably with subscriber unit, wireless subscriber unit, Wireless subscriber device or the like. The communication devices of particular interest are those providing or facilitating voice/audio communications services and suitable to employ the concepts and principles further noted below that operate over wide area networks (WANs), such as conventional two way systems and devices, various cellular phone systems including analog and digital cellular, CDMA (code division multiple access) and variants thereof, GSM, GPRS (General Packet Radio System), 2.5G and 3G systems such as UMTS (Universal Mobile Telecommunication Service) systems, Internet Protocol (IP) Wireless Wide Area Networks like 802.16, 802.20 or Flarion, integrated digital enhanced networks and variants or evolutions thereof. Furthermore the wireless communication units or devices of interest can have short range wireless communications capability normally referred to as WLAN capabilities, such as IEEE 802.11, Bluetooth, or Hiper-Lan and the like preferably using CDMA, frequency hopping, OFDM or TDMA access technologies. The communication units may also support direct connections between two communication units.

As further discussed below various inventive principles and combinations thereof are advantageously employed to essentially substitute synchronization information for normal content in a percentage of data or voice frames at the originating unit, detect the presence of this information and update the decryption process at the receiving communication unit without undue degradation in voice or audible signals or undue latency in re-establishing synchronization provided these principles or equivalents thereof are utilized.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions.

Much of the inventive functionality and many of the inventive principles are best implemented with or in software programs or instructions and general purpose or digital signal processors or other integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts of the preferred embodiments.

Referring to FIG. 1, a simplified and representative system level diagram of a communications system with a multiplicity of communication units (three depicted) that can employ secure communications will be discussed and described. FIG. 1 depicts a communication system infrastructure 101 and communication units 103, 105 that are wireless communication units. Communication units 103, 105 can communicate with each other via the signals or air interfaces 107 that are routed through the infrastructure 101 or possibly through a direct connection or air interface or signal 109. The communications system infrastructure is also shown with fixed network equipment (FNE) 111, such as a network switch, that is further coupled to a wide area network 113, such as the public switched telephone network or Internet and via this network to a communication unit 115. The communication units 103, 105, 115 are advantageously arranged to engage in secure communication between the units as well as with a user such as a dispatcher or other operator (not shown) within the FNE 111.

In secure communication, encryption is applied by the transmitting device, alternatively called the sending or originating device or Originator. The receiving device, often called the Target, must apply decryption, which is often the inverse of the encryption performed by the Originator. One typical scheme for encrypting communication is the use of an encryption algorithm where the state of the algorithm changes with each time interval, such as a data frame. As the state changes, an output vector changes. The output vector is often combined with traffic or payload information, such as voice data with an exclusive or (XOR) operation where the output of the XOR process or operation is then used to generate a communication signal for transmission. In order for the Target to successfully perform decryption, it must know the current state of the encryption algorithm and therefore the output vector. Given the output vector, it can be combined in an XOR operation with the received data. One embodiment of this is further described below with reference to FIG. 3.

During initialization of a communication link, information sufficient to establish the initial state of the encryption algorithm is exchanged or otherwise provided to the Originator and the Target, where this information is normally provided over a pre-existing secure connection. After the Originator and Target begin exchanging traffic each of the respective encryption or decryption algorithms should progress through the same states. If the Originator transmits a certain number of Voice Frames, the Target should decode the exact same number of Voice Frames. If so, both the Originator and Target will progress through the same number of iterations in the encryption algorithm, and so the encryption/decryption process is successful.

However, it is possible for the Originator and Target to "lose crypto-sync," for example if packets are lost or inserted, for example in the link from the network to the Target. When that happens, the decryption algorithm running at the Target does not produce the inverse of the encryption algorithm running at the Originator until crypto-sync is re-established. The result is that random data is recovered and, for example sent to the vocoder at the Target, resulting in random garble being played out as audio. Below we will discuss various advantageous and inventive concepts and principles that will resolve these concerns without undue latency or changes in typical network infrastructure.

Figure 2:
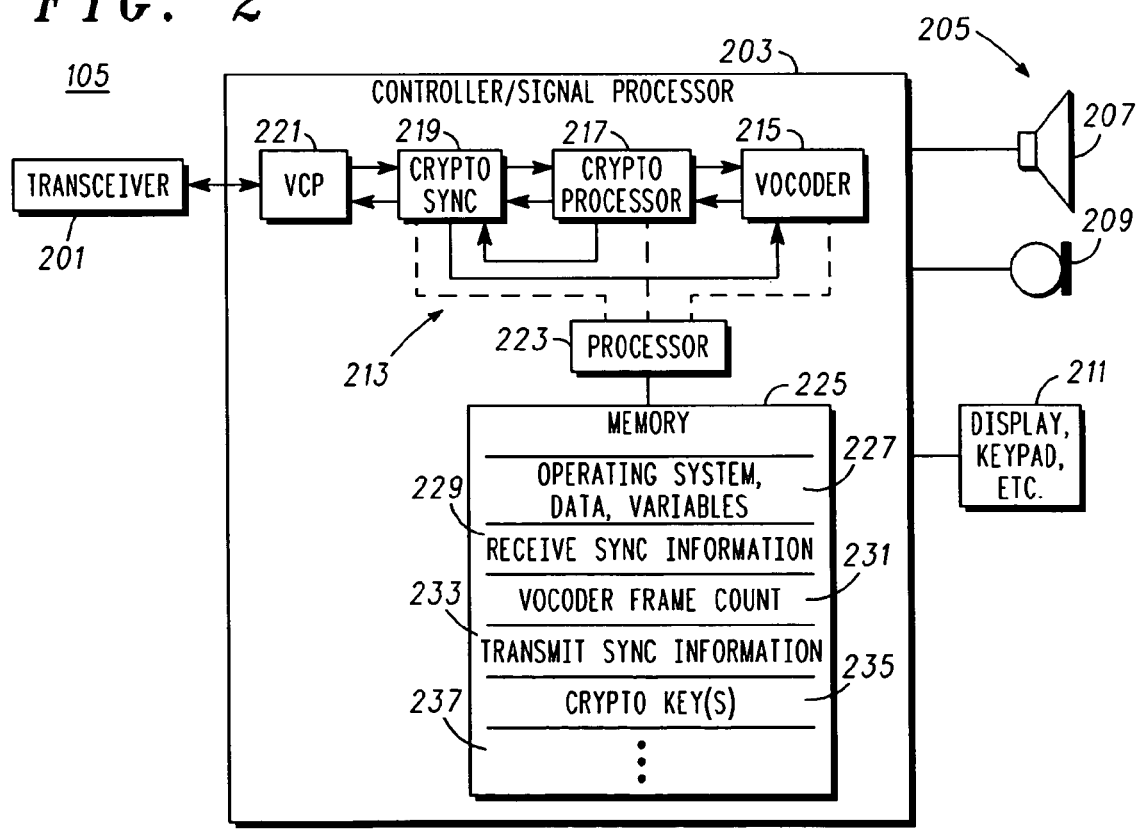
FIG. 2 depicts, in a simplified and representative form, a communications unit suitable for utilizing various embodiments.

Referring to FIG. 2, a simplified and representative block diagram according to various embodiments of a communication unit, such as communication unit 105, that is suitable for utilizing various embodiments of apparatus and methods to facilitate maintenance of crypto synchronization will be discussed and described. The communication unit includes a transceiver 201 that supports the interface between the communication unit and relevant network. The transceiver may be a radio frequency transceiver in wireless applications such a unit 105 but may be some other form of network transceiver for wired applications such as unit 115. In any event the transceiver is generally known, will vary with the interface that is supported, and generally is not further relevant to the remaining discussions.

The transceiver 201 is coupled to a controller and signal processor (hereinafter controller) 203 and the controller 203 is further coupled to a user interface 205. The user interface 205 includes various generally known and widely available entities suitable for effecting interaction with a user. These entities include, for example, a speaker or earpiece 207, a microphone 209, and a display or visual output device, input device such as keyboard, keypad, joystick, etc. 211 or the like. The controller 203 is generally responsible for effecting an interaction between the unit and a user, command and control of the transceiver and unit, as well as much of any base band signal processing.

The controller 203 as shown depicts signal processing functions 213, where the signal processing functions further comprise a vocoder 215, a crypto processor 217, a crypto synchronizer 219, and a channel or voice channel procedure or process 221, each of which will be described in further detail below. The controller 203 further comprises a processor 223 coupled to a memory 225 and inter coupled to one or more of the signal processing functions as shown. The processor 223 can be comprised of one or more general purpose microprocessors or digital signal processors, or the like, where such devices are widely available and generally known. The specific arrangement is likely to be communication unit and feature specific and depend on processor capacity that may be required for a given system and so forth. Note that one or more of the above noted signal processing functions can be implemented in or assisted or controlled by the processor or portions thereof.

The memory 225 includes software or firmware instructions or routines that when executed by the processor result in the processor or controller performing the task(s) the controller or processor is responsible for. The memory also includes data or databases and variables that may be required to perform its duties. The memory includes an operating system, data and variables 227, a receive synchronization information routine 229, a vocoder frame count for receive and transmit routine 231, a transmit synchronization information routine 233, cryptographic key(s) database and routines 235, as well as various other applications, databases, and routines 237, such as user interface drivers, call processing routines, etc., that will be evident to one of ordinary skill and that may vary from unit to unit.

The signal processing functions 213 is an apparatus that is arranged and constructed to facilitate maintaining crypto synchronization while processing communication signals. The apparatus includes the vocoder 215 that in a transmit mode is configured to convert input audio band signals originating from, for example, the microphone, to vocoder output frames that in one embodiment are then applied to the crypto processor 217. In a receive mode the vocoder is further configured to convert vocoder input frames to output audio band signals that are used to drive the earpiece 207. Various detailed functions, such as analog to digital and digital to analog converters, amplifiers, filters, and the like are not specifically depicted but will be appreciated by one of ordinary skill to be present. Vocoders are generally known and come in varying arrangements. One arrangement that will be used to demonstrate by example the concepts and principles described and taught herein and used in various embodiments according to the invention is a advanced multi-band excitation (AMBE+2) vocoder available from Digital Voice Systems, Inc.

Furthermore, the crypto processor is coupled to the vocoder and configured to encrypt the vocoder output frames to provide encrypted output frames in a transmit mode and further configured to decrypt input frames to provide the vocoder input frames in a receive mode. In overview in some embodiments the crypto processor encrypts vocoder output frames by forming an exclusive OR product of each bit in a vocoder output frame with an encryption bit in an encryption vector, where the encryption vector varies with each vocoder output frame, and decrypts the input frames by forming an exclusive OR product of each bit in an input frame with a decryption bit in a decryption vector, where the decryption vector varies with each input frame. This will be described in more detail below with reference to FIG. 3.

The synchronizer or crypto synchronizer 219 is coupled to the crypto processor and configured to substitute in a predetermined manner synchronization information corresponding to an encryption state of the crypto processor 217 for a portion (for example 34 out of 99 bits in an AMBE+2 frame) of the encrypted data in a portion (for example 1 of 8 or 6 or 4 or 3 of 8 frames) of the encrypted output frames to provide resultant output synchronization frames which are applied to the VCP 221 for transmit processing/encoding. The particular count of the output frames and input frames can be maintained in both the transmit and receive mode by the vocoder frame count routine 231.

For example in certain embodiments the crypto processor 217 includes a state counter and the synchronizer 219 generates the synchronization information, possibly aided by the processor and transmit sync information routine 233, by obtaining a value corresponding to the state counter contents (for example, 14 least significant bits of a 42 bit state counter) and calculating and appending a check sum (such as a 20 bit Cyclic Redundancy Code) to this value to provide the synchronization information corresponding to each one of the portion of the encrypted output frames. In some embodiments, the synchronization information is substituted for the portion of the encrypted data where the portion is selected to have limited impact on audio quality of resultant output audio band signals at the target unit.

In the receive mode, where the vocoder is configured to convert vocoder input frames to output audio band signals and the crypto processor is arranged to decrypt input frames to provide the vocoder input frames, the synchronizer is further configured to determine whether an input frame includes corresponding synchronization information and if so update a state of the crypto processor using the corresponding synchronization information. In one embodiment the synchronizer is configured to facilitate parsing each input frame from the VCP 221 into a first part and a second part. After that a check sum corresponding to the first part is calculated and compared to an embedded check sum within the input frame using the processor and receive sync information routine 229 as will be appreciated. When the comparison is favorable, it is decided that the first part of the input frame includes the corresponding synchronization information. When the input frame includes the synchronization information, the synchronizer so informs the vocoder and the vocoder further processes only the second part of the input frame to provide a corresponding audio band signal and when the frame does not include synchronization information the vocoder further processes the input frame to provide the corresponding audio band signal.

Figure 3:
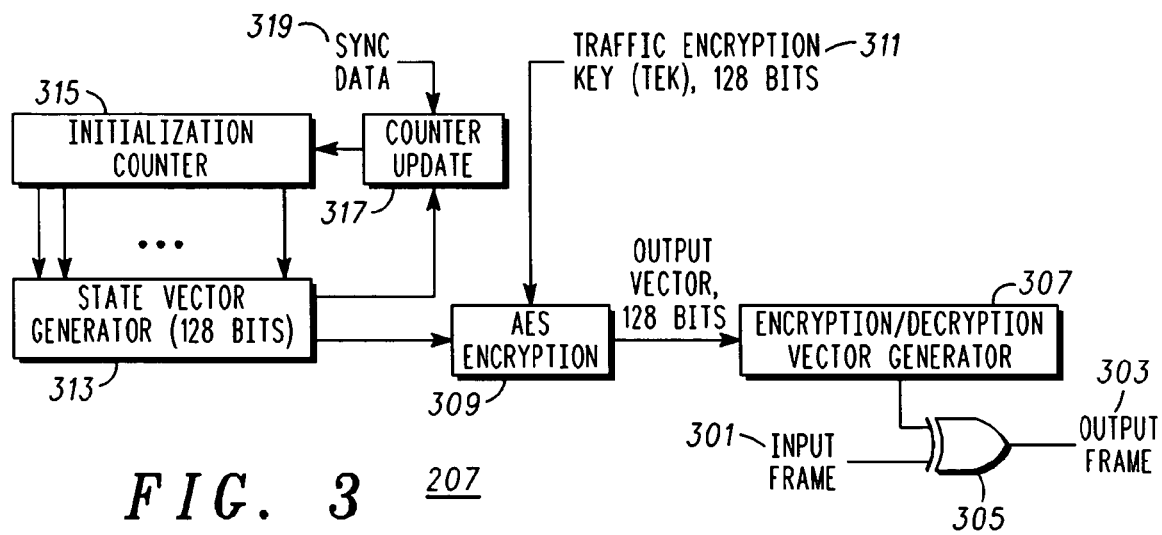
FIG. 3 illustrates in a simplified and representative form a block diagram for a cryptographic processor suitable for use in the communication unit of FIG. 2.

Referring to FIG. 3, a simplified and representative block diagram for a cryptographic processor suitable for use in the communication unit of FIG. 2 will be discussed and described. FIG. 3 shows an input frame 301 and an output frame 303 where the output frame is comprised of an exclusive OR product formed by the XOR function 305 of the input frame and a vector provided by the vector generator 307. As each bit of the input frame is presented to the exclusive OR function 305 a corresponding bit of the vector (encryption/decryption vector) provided by vector generator 307 is exclusive OR'd with the input bit to provide a corresponding bit of the output frame.

Note that in a transmit mode the input frame can be a vocoder output frame, while in a receive mode the input frame can be a frame that has been received and decoded according to the VCP 221. So long as the vector that is used at the target communication unit to decrypt a frame is the same as the one used at the originating communication unit to encrypt the same frame the resulting output frame can be useable information, whereas if these encryption and decryption vectors are different the output frame may likely be useless. This becomes more of issue once it is noted that the vector changes for each time interval, typically for each frame.

The vector in one embodiment is the first 99 bits of a 128 bit vector supplied by an Advanced Encryption Standard (AES) vector generator 309. AES encryption is known and will not be discussed in detail, other than to note that the 128 bit vector is a function of a 128 traffic encryption key (TEK) 311 and a 128 bit state vector provided by a state vector generator 313. The TEK is formed by both the origination unit and target unit from time to time, for example at the time a call is setup by exchanging information between the units using either a predetermined secure link (communication channel with a known but secret key) or limiting the exchange of information between the units to less than a third party would need to form the TEK. Known methods of doing either are available as will be appreciated by one of ordinary skill.

The 128 bit state vector formed by the state vector generator 313 is a function of the outputs of initialization counter 315 that in one embodiment is a 42 bit counter. As the state vector is supplied, a counter update 317 is triggered and the initialization counter is incremented. This occurs for example with each interval or new frame. Note that in theory the same thing is occurring at the originator and target and thus the system maintains crypto-synchronization, unless a packet is lost or inserted as noted earlier. Crypto synchronization can be re-established or maintained at the target by loading synchronization data 319 provided by the synchronizer. The synchronization data 319 can be provided to the counter update function 317 or directly to the initialization counter. In one embodiment this data is the 14 least significant bits from the originators initialization counter as will be discussed below with reference to FIG. 6.

Figure 4:
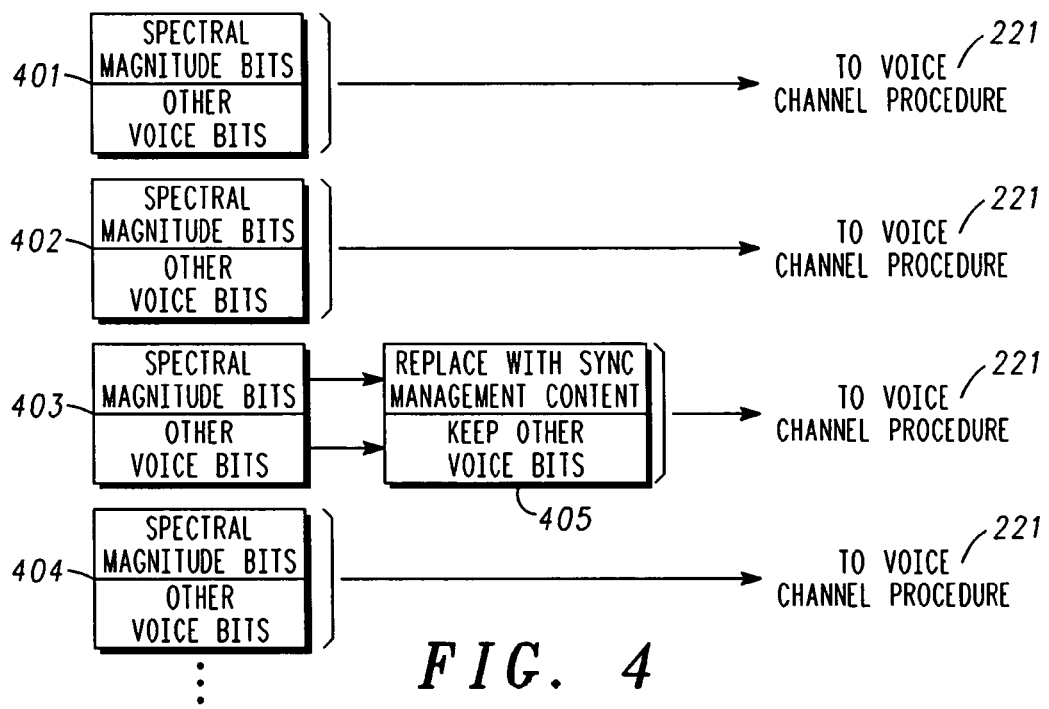
FIG. 4 depicts a sequence of data frames with one frame modified to include synchronization information.

Referring to FIG. 4, a sequence of data frames with one frame modified to include synchronization information will be briefly described and discussed. As depicted frames 401-404 are shown with spectral magnitude bits and other voice bits (discussed below) and frames 401, 402, and 404 are routed directly to the VCP 221. These frames 401-404 are frames from the vocoder, e.g. vocoder output frames or encrypted versions thereof from the crypto processor 217. Frame 403, unlike the other three is modified by the crypto synchronizer by replacing the spectral magnitude bits with synchronization information or synchronization management content 405 while keeping the other voice bits. The resultant frame is routed to the VCP 221. FIG. 4 shows one exemplary embodiment based on observations when an AMBE+2 vocoder is used. Other vocoders will likely yield different but analogous approaches; where generally certain information from the vocoder, for example, may have limited impact on parameters such as voice quality. When these bits or locations of limited impact are determined these locations can be used to carry synch management or synchronization information.

In the exemplary AMBE+2 vocoder, each Voice Frame consists of 99 bits, 41 of which are "spectral magnitude bits." During speech reconstruction, these 41 bits are translated into a code book index value, and each index value represents a codeword vector. These codeword vectors represent the spectral magnitude error associated with the encoding process and are added back on during decoding to account for this error. In effect these 41 bits describe the spectral magnitude quantization error and are the least perceptually important bits required during speech reconstruction. With the 4400 bps AMBE+2 vocoder, there is an option available during speech reconstruction, i.e. the 41 spectral magnitude bits can be ignored during reconstruction. That is, the software for the vocoder simply does not execute certain parts of the code, e.g. the parts related to using those bits. Such a Voice Frame may be referred to alternately as modified, stuffed, or synch management frame or the like when the synchronization information is included with the frame. Note that a stuffed Voice Frame is entirely different from a Voice Frame with channel errors in the 41 spectral magnitude bits. If Voice Frames are stuffed occasionally, for example 1 of 8 or 1 of 6, etc., there is not much effect on audio quality as will be discussed below with reference to FIG. 8.

Figure 5:
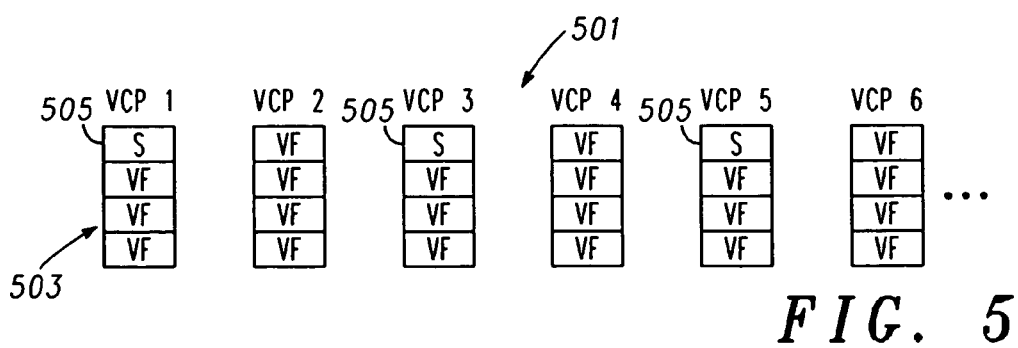
FIG. 5 shows an arrangement of normal and modified frames.

Referring to FIG. 5 an exemplary arrangement of normal and modified frames will be reviewed and discussed. It is noted that the particular arrangement will depend on the vocoder as well as VCP organization, etc. for a particular system. In one system, namely an integrated digital enhanced network system available from Motorola, Inc., the AMBE+2 vocoder is used and a VCP frame is 90 ms. The VCP frame includes four 22.5 ms Voice Frames. Each Voice Frame consists of 99 bits, and each VCP frame may transmit four Voice Frames, or 396 voice bits. Tasks such as reordering of vocoder bits based on importance, Forward Error Correction (FEC), Cyclic Redundancy Check (CRC) coding, and time interleaving are performed on the bits within one complete VCP frame. FIG. 5 shows 6 VCP frames, VCP1-VCP6, each 90 ms in duration and each including 4 voice frames 503. Every other VCP frame includes one sync management frame 505, e.g. 1 of 8 voice frames is modified or stuffed.

Referring to FIG. 6, a block diagram demonstrating certain functionality of the crypto synchronizer 219 will be discussed and described. FIG. 6 shows 14 bits 601 that are the least significant bits of the 42 bit state initialization counter 315 discussed with reference to FIG. 3. A 20 bit CRC is formed by CRC function 603 (for example the TX sync information routine 233 may be utilized) from these 14 bits. This 20 bit CRC, the original 14 bits, are combined or merged along with 7 spare bits 605 to form a 41 bit block of synchronization information or sync management information that is inserted into appropriate voice frames (1 of 8 voice frames, for example) in lieu of the spectral magnitude bits. Thus the crypto synchronizer 219 in the transmit mode keeps track of the frame count and every 8 frames calculates and inserts the corresponding synchronization information as will be further discussed with reference to FIG. 7.

Referring to FIG. 7, a simplified and exemplary system level functional diagram for a synchronization management scheme will be described and discussed. FIG. 7 generally shows the processes 701-707 that are being undertaken in the originating unit's signal processing function, the channel 709 indicating transport, and then the processes 711-723 in the target communication unit's signal processing function. As an overview the method of facilitating crypto synchronization for secure communication that is practiced at the originator generally includes providing synchronization information that is suitable to synchronize a decrypting process at a target communication unit and then substituting in a predetermined manner, such as noted above, this synchronization information for a portion of the information or payload that would otherwise have been sent to the target unit.

More specifically an audio band signal 706, such as voice is applied to a vocoder 701 that generates communication data, e.g. a vocoder frame or a series or sequence of vocoder frames that in one embodiment as noted above are 99 bits long. This communication data or vocoder frames are then encrypted using the XOR encrypting process 703, such as the apparatus described with reference to FIG. 3 to provide encrypted communication data or encrypted vocoder output frames. These frames as encrypted are applied to the process at 705 implemented, for example, in the crypto synchronizer. If the frame count indicates that this should be a modified frame, e.g. stuffed frame, then synchronization information is provided or generated where the synchronization information comprises state information for the encryption process as well as a check sum corresponding to the state information. Specifically for example, the corresponding 14 least significant bits from the initialization counter are obtained and a 20 bit CRC is calculated. Thus the synchronization information that is provided comprises synchronization information corresponding to a state of the encryption process. The resultant block of synchronization information is suitable to synchronize a decrypting process at a target communication unit. The synchronization information that is provided is suitable for detecting the synchronization information or presence thereof (detect the CRC) at the target communication unit.

This information is substituted in a predetermined manner for a portion of the encrypted communication data, e.g. 41 bits of spectral magnitude data in the corresponding frame to provide resultant data to route to the VCP for encoding 707 to be sent to the target communication unit. Note that the substituting in a predetermined manner comprises inserting the synchronization information into the vocoder frame as encrypted in lieu of a portion of the vocoder frame. Given the sequence or series of vocoder frames, the inserting the synchronization information comprises inserting the synchronization information in a predetermined portion of the series of vocoder frames, such as 1 of 8 or 1 of 6, etc.

In summary a series of vocoder data frames is provided from the vocoder and these vocoder data frames are encrypted with the encrypting process. Synchronization information is provided that corresponds to state information for the encryption process and a check sum corresponding to the state information. The state information is changing as a function of a location of a vocoder data frame within the series of vocoder data frames. This synchronization information is substituted in a predetermined manner by inserting in each of a predetermined portion (41 spectral magnitude bits) of the vocoder data frames the state information and the check sum corresponding to each of the predetermined portion (1 of 8, etc.) of the vocoder data frames.

After transport over the channel 709 the target unit implements a method of facilitating crypto synchronization for secure communication via the processes indicated by 711-723. Generally a frame of communication data, e.g. a 99 bit frame is obtained from the VCP decoding process 711. Then it is determined whether a portion of the frame includes synchronization information 713 using for example the crypto synchronizer at the target unit. This is done by checking a CRC corresponding to the 41 bits and when the frame includes synchronization information (CRC checks), the synchronization information is used to update a decryption process 715, 721 thereby facilitating crypto synchronization. The functions at 713, 715 are the responsibility of the crypto synchronizer at the target unit.

More specifically the determining whether a portion of the frame includes synchronization information comprises parsing the frame of communication data into a first part, e.g. the 41 bits, and a second part or remaining voice bits; calculating a check sum corresponding to the first part, e.g. based on the 14 bits and comparing the check sum to an embedded check sum, e.g. the CRC calculated and added at the originator, within the frame of communication data; and then only when the comparison is favorable, e.g. calculated check sum or CRC equals embedded check sum or CRC, deciding that the first part of the frame of communication data includes the synchronization information. As noted earlier the synchronization information comprises state information corresponding to a state machine at the originator and thus corresponding to a state machine or state of the state machine that should be used in the decryption process.

AT 715 it is noted that when the CRC checks the decryption state machine is updated 717, e.g. using the 14 bits as discussed with reference to FIG. 3 and an indication 719 is passed to the vocoder 723 where the indication signals the vocoder that only the remaining voice bits (99−41=58) should be processed. Thus when the frame includes synchronization information the synchronization information is used to update the state machine. The frame of communication data is decrypted using the decryption process as updated and then only the frame less the portion of the frame with the synchronization information is further processed by the vocoder 723 to provide user information or output audio band signals and when the frame does not include synchronization information the entire 99 bit frame is further processed to provide the user information.

Figure 9:
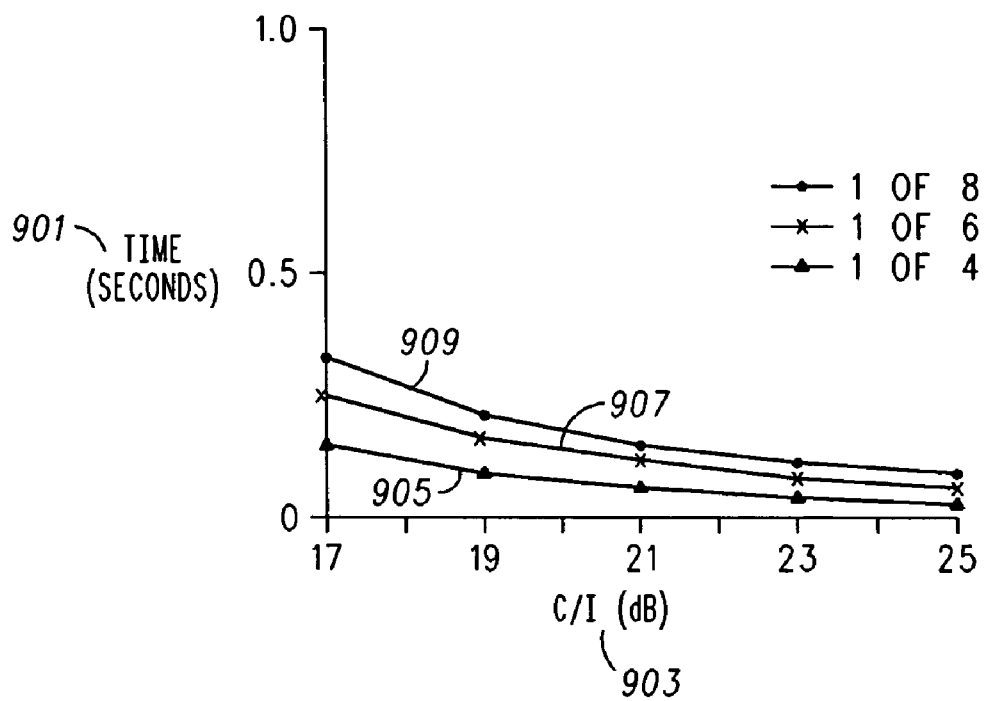
Figure 10:
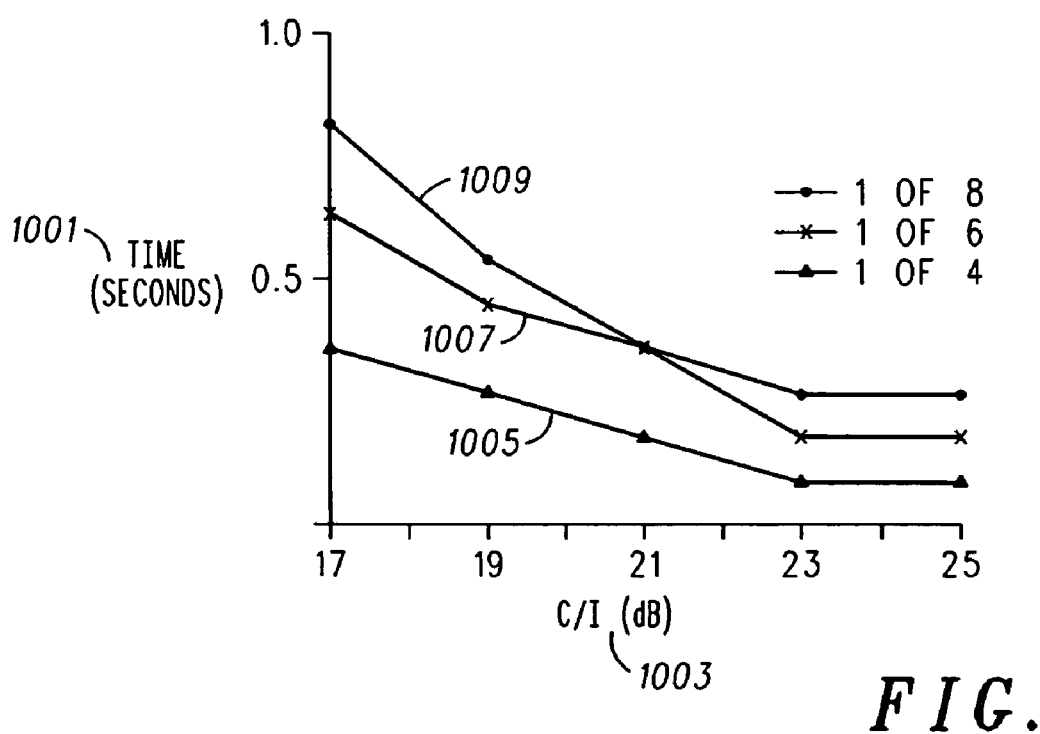

Referring to FIG. 8 through FIG. 10 various performance information/data for a crypto-synchronization management scheme will be discussed and described. FIG. 8 shows a table comparing a rate of frame stuffing 801 with corresponding percentage of frames that are modified 803 with perceptions of the impact on audio quality 805 for an AMBE+2 vocoder. Note that for 1 of 6 or 1 of 8 rates of frame modification there is little perceived reduction in audio quality.

FIG. 9 shows average time 901 to re-establish crypto synchronization as a function of carrier to interference levels 903 on the channel when 1 of 4 905, 1 of 6 907, and 1 of 8 909 frames are stuffed with synchronization information. The re-establishment is a function of carrier to interference levels as well as frequency of sending the synchronization information.

FIG. 10 depicts a 90 percentile value of time 1001 to re-establish crypto synchronization as a function of carrier to interference levels 903 on the channel when 1 of 4 1005, 1 of 6 1007, and 1 of 8 1009 frames are stuffed with synchronization information. The 90 percentile value of time for re-establishment is as expected a function of carrier to interference levels as well as frequency of sending the synchronization information. Generally from this data it is expected that a rate of ⅛ for modified frames should provide reasonable performance results.

The processes, apparatus, and systems, discussed above, and the inventive principles thereof are intended to and will alleviate problems, such as undue latency channel overhead or degradation of voice quality, caused by prior art synchronization management techniques. Using these principles of substituting synchronization information for bits from a vocoder that are less important from time to time, when possible and this depends on particulars of the specific vocoder, will avoid any infrastructure changes, and provide a high quality, low latency, and low overhead method of crypto synchronization.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method of facilitating crypto synchronization for secure communication, the method comprising:

encrypting communication data using an encrypting process to provide encrypted communication data;

providing synchronization information to synchronize a decrypting process at a target communication unit;

substituting in a predetermined manner the synchronization information for a portion of the encrypted communication data to provide resultant data to send to the target communication unit;

determining that resultant data contains synchronization information at the target communication unit during speech reconstruction at the target communication unit, ignoring the synchronization information and processing the encrypted communication data such that the target communication unit does not use or execute the synchronization information during the speech reconstruction, wherein the synchronization information is ignored by processing only a portion of the resultant data within a frame less a portion of the frame having the synchronization information.

2. The method of claim 1 further comprising generating the communication data using a vocoder, wherein the communication data further comprises a vocoder frame.

3. The method of claim 2 wherein the substituting in a predetermined manner further comprises inserting the synchronization information into the vocoder frame in lieu of a portion of the vocoder frame.

4. The method of claim 3 wherein the vocoder frame further comprises a series of vocoder frames and the inserting the synchronization information further comprises inserting the synchronization information in a predetermined portion of the series of vocoder frames.

5. The method of claim 1 wherein the providing synchronization information further comprises providing synchronization information corresponding to a state of the encryption process.

6. The method of claim 5 wherein the providing synchronization information further comprises providing information for detecting the synchronization information at the target communication unit.

7. The method of claim 1 further comprising:
providing a series of vocoder data frames from a vocoder;
wherein the encrypting further comprises encrypting the series of vocoder data frames with the encrypting process;
wherein the providing synchronization information comprises providing information corresponding to state information for the encryption process and a check sum corresponding to the state information, the state information changing as a function of a location of a vocoder data frame within the series of vocoder data frames; and
wherein the substituting in a predetermined manner comprises inserting in each of a predetermined portion of the vocoder data frames the state information and the check sum corresponding to each of the predetermined portion of the vocoder data frames.

8. A method of facilitating crypto synchronization for secure communication, the method comprising;
obtaining a frame of communication data;
determining whether a portion of the frame includes synchronization information that was substituted in a predetermined manner for a portion of encrypted communication data;
when the frame includes synchronization information using the synchronization information to update a decryption process, thereby facilitating the crypto synchronization; and
when the frame includes synchronization information, only the frame less the portion of the frame that includes the synchronization information is further processed during reconstruction of the frame such that a target communication unit does not use or execute the synchronization information during the frame reconstruction.

9. The method of claim 8 wherein the determining whether a portion of the frame includes synchronization information further comprises:
parsing the frame of communication data into a first part and a second part;
calculating a check sum corresponding to the first part and comparing the check sum to an embedded check sum within the frame of communication data; and
only when the check sum matches the embedded check sum deciding that the first part of the frame of communication data includes the synchronization information.

10. The method of claim 8 wherein the synchronization information further comprises state information corresponding to a state machine used in the decryption process.

11. The method of claim 8 wherein:
the frame of communication data is decrypted using the decryption process, the decryption process using a state machine; and
when the frame includes synchronization information, the synchronization information is used to update the state machine.

12. An apparatus arranged and constructed to facilitate maintaining crypto synchronization while processing communication signals, the apparatus comprising:
a vocoder configured to convert vocoder input frames to output audio band signals;
a crypto processor coupled to the vocoder and configured to decrypt input frames to provide the vocoder input frames; and
a synchronizer coupled to the crypto processor and configured to determine whether an input frame includes corresponding synchronization information;
wherein when the synchronizer determines that an input frame includes synchronization information, the vocoder ignores the synchronization information during the conversion of input frames to output audio band signals such that the vocoder does not use or execute the synchronization information of the input frame during the conversion of the input frames to output audio band signals.

13. The apparatus of claim 12 wherein:
the vocoder is further configured to convert input audio band signals to vocoder output frames;
the crypto processor is further configured to encrypt the vocoder output frames to provide encrypted output frames; and
the synchronizer is further configured to substitute in a predetermined manner synchronization information corresponding to an encryption state of the crypto processor for a portion of the encrypted data in a portion of the encrypted output frames to provide resultant output synchronization frames.

14. The apparatus of claim 13 wherein the crypto processor includes a state counter and the synchronizer generates the synchronization information by obtaining a value corresponding to the state counter contents and appending a check sum to this value to provide the synchronization information corresponding to each one of the portion of the encrypted output frames.

15. The apparatus of claim 13 wherein the synchronization information is substituted for the portion of the encrypted data where the portion is selected in view of audio quality of resultant output audio band signals.

16. The apparatus of claim 12 wherein the synchronizer is further configured to facilitate:
parsing the input frame into a first part and a second part;
calculating a check sum corresponding to the first part and comparing the check sum to an embedded check sum within the input frame; and
only when the check sum matches the embedded check sum deciding that the first part of the input frame includes the corresponding synchronization information.

17. The apparatus of claim 12 wherein when the input frame includes synchronization information, the synchronizer updates a state of the crypto processor using the synchronization information.

18. The apparatus of claim 12 wherein the vocoder is an AMBE+2 vocoder and the crypto processor;
encrypts vocoder output frames by forming an exclusive OR product of each bit in a vocoder output frame with an encryption bit in an encryption vector, the encryption vector varying with each vocoder output frame, and
decrypts the input frames by forming an exclusive OR product of each bit in an input frame with a decryption bit in a decryption vector, the decryption vector varying with each input frame.

19. The apparatus of claim 12 utilized in a communication unit.

* * * * *